Patented May 18, 1948

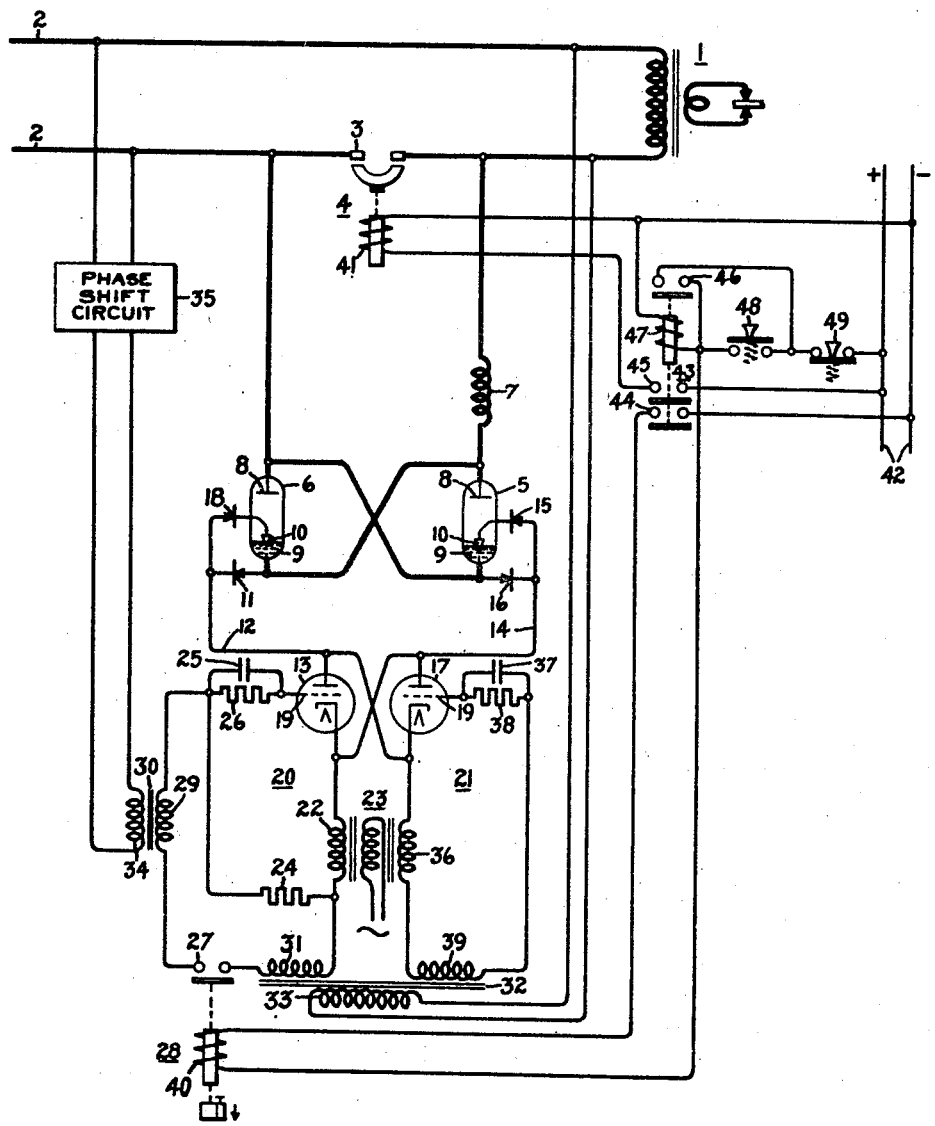

2,441,789

UNITED STATES PATENT OFFICE 2,441,789

ELECTROMAGNETIC SWITCHING SYSTEM AIDED BY SPACE-DISCHARGE DEVICE

Maurice E. Bivens, Schenectady, N. Y., assignor to General Electric Company, a corporation of New York Application June 28, 1944, Serial No. 542,491

6 Claims. (Cl. 175—320)

The present invention relates to electric control systems and more particularly to improved electric valve control systems for controlling energization of an alternating current load circuit. While not limited thereto, the present invention is particularly well adapted for use in connection with intermittently energized loads such as the welding transformer of resistance or flash welding systems.

The precise control which may be accomplished by the use of electric discharge valves offers many advantages in circuits where the instant of initiation of energization of a load circuit is important from the standpoint of transient current flow, and where it is desired to transmit a predetermined number of half cycles or an even number of half cycles of current to the load. In some applications, the electrical rating of the valves required for handling the power of the load circuit would render their use impossible or impracticable from a cost point of view. In accordance with the teachings of the present invention, electric discharge valves are employed and arranged in circuit in such a manner that they are effective to control the energization of a load circuit during the portions of the interval which require the precise controlling action which they are suited to accomplish and in which they are relieved of current carrying duty during the remainder of the interval of energization of the load, so that they may be employed in circuits having electrical requirements far in excess of their continuous rating.

It is an object of the present invention to provide a new and improved electric control circuit.

It is another object of the present invention to provide a new and improved electric valve control system in which the precise control characteristics of the electric valves are utilized, and in which the electric valves are relieved from current carrying duty during intervals when such control characteristics are not required.

It is a still further object of the present invention to provide a new and improved control circuit for operating a pair of reversely connected electric valve means in leading and trailing relationship.

In the illustrated embodiment of my invention a load circuit, such as a welding transformer, is energized from an alternating current supply circuit through the contacts of an electromechanical circuit controller and a pair of reversely connected electric valve means connected in parallel circuit relation with respect to the contacts. The control of the circuit controller and the electric valve means is arranged so that initiation of energization of the load circuit is effected by the electric valve means at the instant of the supply circuit voltage wave corresponding to the minimum transient load current. The electric valve means are relieved of current carrying duty by the subsequent closure of the electromechanical circuit controller. The excitation circuits of the electric valve means are so arranged that each valve is rendered conductive in response to energization of the load circuit by the other valve and that during the interval that the load is being energized through the contacts of the circuit controller the excitation circuits for each of the electric valves are energized for conductive operation of the electric valves when the circuit controller opens its contacts. When it is desired to interrupt the supply of current to the load circuit, the electromechanical circuit controller is opened and then the excitation circuit of the leading electric valve is opened to prevent a further initiation of conduction by this valve. The period of energization of the load circuit is in this way always terminated at the end of a half cycle during which the trailing electric valve conducts. In this manner substantially transientless starting is provided and each period of energization ends on a cycle of opposite polarity from the half cycle during which energization was initiated, thus insuring the same magnetic condition of the load circuit at the close of each period of energization. At the same time, due to the very short duty cycle imposed on the electric valve means, the electrical rating of the valve means required is substantially reduced.

The present invention will be better understood by reference to the following description taken in connection with the accompanying drawing, and its scope will be pointed out in the appended claims. In the drawing, the single figure is a schematic representation of one embodiment of the present invention.

Referring now to the drawing, the present invention is illustrated as embodied in a system for controlling the energization of a welding transformer 1 from an alternating current supply circuit 2 through parallel circuits, one of which includes contact 3 of an electromechanical circuit controller or breaker 4 and the other of which includes the anode-cathode circuits of a pair of reversely connected electric valve means 5 and 6 and a current limiting reactor 7. The electric valve means 5 and 6 are preferably of the type comprising an anode 8, a cathode 9 of conducting liquid and an immersion-ignitor or make-alive type electrode 10. As is well understood, the initiation of conduction in electric valves of this type is accomplished by supplying an impulse of current of predetermined magnitude to the ignitor or starting electrode. In the arrangement illustrated, the electrode 10 of valve 5 is connected to be energized in accordance with the anode voltage of the valve 5 through a circuit including a unilaterally conducting device 11, conductor 12, electric discharge device or firing valve 13, conductor 14 and unilaterally conducting device 15. In a similar manner, the starting electrode 10 of electric valve 6 is energized in accordance with the anode voltage thereof through a circuit including unilaterally conducting device 16, conductor 14, electric discharge device 17, conductor 12 and unilaterally conducting device 18. The electric discharge devices 13 and 17 are preferably of the type employing an ionizable medium, such as a gas or a vapor, and each includes a control member or grid 19 for controlling the initiation of conduction therethrough, and, as a result, controlling the initiation of conduction of electric valve means 5 and 6. The control member 19 of electric discharge device 13 is controlled by an excitation circuit designated generally by the numeral 20, and electric discharge device 17, which controls the initiation of conduction of electric valve 6, is controlled by an excitation circuit illustrated by the numeral 21 and which is arranged to render the electric valve 6 conducting for each half cycle of conduction of electric valve 5. In other words, circuits 20 and 21 control electric valves 5 and 6 to render them conductive in leading and trailing relationship. The excitation circuit 20 includes the secondary winding 22 of a transformer 23 having the primary winding thereof energized from a supply of alternating voltage which is synchronous with respect to the voltage of supply circuit 2 and which is preferably energized from the circuit 2. One terminal of secondary winding 22 is connected to the cathode of electrode discharge device 13 and the other terminal is connected to the control member 19 of device 13 through an impedance element such as a resistor 24 and a self-biasing circuit including parallel connected capacitor 25 and resistor 26. The voltage of winding 22 is substantially 180 degrees out of phase with the voltage of the anode of device 13 and together with the self-biasing circuit tends to maintain the device 13 non-conducting. A circuit in parallel with resistor 24 and including an initiating contact 27 of an initiating relay 28, a secondary winding 29 of a peaking transformer 30 and the secondary winding 31 of a transformer 32 provides means for initiating conduction of discharge device 13 at the desired instant in the half wave of voltage during which the anode of discharge device 13 is positive and for rendering discharge device 13 conducting for each half cycle thereafter following a half cycle of conduction by discharge device 17 until such time as the initiating contact 27 is open. The primary winding 33 of transformer 32 is energized from the voltage appearing across the primary winding of the welding transformer 1. The primary winding 34 of the peaking transformer 30 is energized from the alternating current supply circuit 2 through a suitable phase shifting circuit illustrated schematically and designated generally by the numeral 35.

The excitation circuit 21 of electric discharge device 17 includes a secondary winding 36 of transformer 23 which, together with a self-biasing circuit including parallel connected capacitor 37 and resistor 38, impresses a voltage on control member 19 of discharge valve 17 tending to maintain discharge device 17 non-conducting. A secondary winding 39 of the transformer 32 impresses an alternating voltage on control member 19 sufficient in magnitude to render the discharge device 17 conducting during each half cycle of voltage of the supply circuit following a half cycle of conduction by the discharge device 13. With the excitation circuits 20 and 21 just described initiation of conduction by firing electric valves 13 and 17, and as a result electric valves 5 and 6, always starts with electric valve 5 at the instant determined by the occurrence of the first positive voltage peak of winding 29 after closure of initiating contact 27. Thereafter valves 5 and 6 trail each other until initiating contact 27 is open and the energization is terminated at the termination of conduction by electric valve 6 at the end of the next half cycle of voltage.

The operating coil 40 of initiating relay 28 and the operating coil 41 of circuit controller 4 are energized in such a manner that the initiation and termination of energization of the load circuit are accomplished by conduction through electric valves 5 and 6, and the load current during the intermediate portion of each energization period is conducted by the contact 3 of circuit controller 4. The energization of these operating coils from a source of unidirectional control voltage 42 is controlled by a control relay 43 having contacts 44, 45 and 46. The operating coil 47 of relay 43 is energized from the source of control voltage through a circuit including a normally open manually operable starting switch 48 and a normally closed manually operable stop switch 49. Contacts 44 and 45 control the energization of operating coils 40 and 41, respectively, and contact 46 maintain the energizing circuit for the operating coil 47 of relay 43 by shunting the starting switch 48.

The features and advantages of the present invention will be better understood by a brief consideration of the operation of the illustrated embodiment. When starting switch 48 is closed, control relay 43 picks up immediately, seals itself in through its contact 46 around the starting switch 48, and closes the energizing circuits of operating coils 40 and 41 through its contacts 44 and 45. Since the circuit controller 4 is a large circuit breaker, its operating time is considerably greater than control relay 28, thus insuring the closure of initiating contact 27 prior to the closure of the power contact 3 of circuit controller 4. If desired, additional delay may be interposed in the energizing circuit of the operating coil 41. As soon as initiating contact 27 is closed, electric discharge device 13 is rendered conductive at the instant determined by the occurrence of the first positive peak of secondary winding 29 of peaking transformer 30. Conduction by device 13 and the resultant conduction by electric valve 5 energizes the welding transformer 1 and produces a control voltage in the feedback transformer 32 to render electric discharge device 17 conducting as soon as the anode thereof becomes positive, thus initiating conduction in electric valve 6. Thereafter the control voltage of feedback transformer 32 causes valves 13 and 5 to trail valves 17 and 6 and the trailing action continues. It will be understood that the phase shifting circuit 35 is adjusted so that the initiation of energization of the load occurs at the instant for minimum current transient or, expressed in another way, at the instant in the voltage wave corresponding to normal current zero. As soon as the contacts 3 of circuit controller 4 are closed, anode voltage is substantially removed from electric valves 5 and 6 so that these valves do not conduct current. However, the excitation circuits 20 and 21 maintain electric valves 5 and 6 in a conductive condition, during alternate half cycles of voltage, by virtue of the feedback voltages produced in secondary windings 31 and 39 of transformer winding 32. When it is desired to terminate a period of energization of the load circuit, the stop switch 49 is opened to drop out control relay 43 and open its contact 45 to deenergize the operating coil 41 of circuit controller 4. The operating coil 40 of initiating relay 28 is simultaneously deenergized by opening of contact 44 of control relay 43, but a slight time delay in the dropping out of relay 28 is provided to insure that the current to the load will be interrupted by electric valves 5 and 6. As soon as contact 3 of circuit controller 4 opens, the electric discharge device 13 or 17 is rendered conducting depending upon which anode voltage is positive. If discharge device 13 is rendered conducting, discharge device 17 follows during the next half cycle and terminates the period of energization at the end of that half cycle since no further initiation of conduction of electric discharge device 13 is possible after opening of initiating contact 27. Thus the energization of the load circuit is always initiated by electric discharge device 13 and valve 5 and always terminated at the end of a half cycle of voltage of opposite polarity by electric discharge device 17 and valve 6. By always terminating the energization of the load on a half cycle of one polarity, the magnetic state of the transformer at the beginning of each period of energization is more uniform, thus facilitating the starting of the system with minimum starting transient.

The magnitude of the feedback voltage produced in the excitation circuit 20 by the transformer winding 31 is sufficient to render firing electric valve 13 conductive at any point in the cycle so that operation of firing valve 13 and electric valve 5, when current is transferred from the breaker 4 to the valves 5 and 6, is independent of the peaked voltage of the winding 29. In the particular system illustrated, the duration of the welding period is determined by the operator. It will be understood, however, that if desired the stop switch 49 may be operated by a time delay relay which is initiated in operation by energization of the control relay 43.

With the arrangement of the present invention, it will be apparent that the current carrying duty imposed on electric valves 5 and 6 is very small compared to the load current being supplied and that the continuous rating of these valves may be much less than the peak current carried for these short intervals. At the same time all of the benefits of valve control with respect to the starting and stopping of current flow are realized.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. In combination, an alternating current supply circuit, a load circuit, electric valve means interconnecting said circuits for transmitting alternating current to said load circuit and including a pair of electric discharge paths connected in reverse parallel relationship, a pair of control members for controlling said discharge paths, and means for energizing said control members to render said discharge paths conductive in leading and trailing relationship including means for impressing on each of the control members a holdoff voltage tending to maintain the associated discharge path non-conductive, means for impressing on each of said control members a control voltage dependent upon conduction by the discharge path with which the other of said control members is associated and sufficient in magnitude to overcome said holdoff voltage to render each of said discharge paths conductive alternately in response to conduction by the other discharge path, means for impressing a periodic voltage of peaked wave form and of predetermined phase position on the control member associated with one of said discharge paths to initiate energization of said load circuit at a predetermined instant during a half cycle of voltage of said supply circuit of one polarity and means for removing said control voltage and said voltage of peaked wave form from said control member circuit of said one discharge path to render said voltages ineffective to initiate a further conduction by said one discharge path and thereby to terminate energization of said load circuit following conduction by the other discharge path.

2. In combination, an alternating current supply circuit, a load circuit, means comprising electric valve means interconnecting said circuits for transmitting alternating current to said load circuit and including a pair of electric discharge paths connected in reverse parallel relationship, a pair of control members for controlling said discharge paths, means for energizing said control members to render said discharge paths conductive in leading and trailing relationship including means for impressing on each of said control members a control voltage dependent upon conduction by the discharge path with which the other of said control members is associated to render each of said discharge paths conductive alternately in response to conduction by the other discharge path, means for impressing an additional voltage component on the control member associated with one of said discharge paths to initiate energization of said load at a predetermined instant during a half cycle of voltage of said supply circuit of one polarity, and means for removing said control voltage and said additional voltage from said control member circuit of said one discharge path to render said voltages ineffective to initiate a further conduction by said one discharge path and thereby to terminate energization of said load circuit following conduction by the other discharge path.

3. In combination, an alternating current supply circuit, a load circuit, electric valve means interconnecting said circuits for transmitting alternating current to said load circuit and including a pair of electric discharge paths connected in reverse parallel relation, a pair of control members for controlling conduction by said discharge paths and means for energizing said control members to render said discharge paths conductive in leading and trailing relationship including means for impressing on each of said control members an alternating voltage substantially in phase opposition with the anode voltage of the associated discharge path, an impedance element connected in series with said last mentioned means in the control member circuit of one of said discharge paths, a source of periodic voltage of peaked wave form, means for producing a control voltage responsive to energization of said load circuit, means including a circuit controller for connecting said control voltage and said periodic voltage across said impedance element to initiate conduction of said one discharge path associated with said control member at a predetermined point in the voltage wave of said supply circuit and to render said one discharge path conductive for each half cycle of voltage following a half cycle of conduction by the other of said discharge paths, means for impressing said control voltage on the control member associated with the other of said discharge paths to render it conductive each half cycle immediately following conduction by said one discharge path, and means for operating said circuit controlling means to open the connection of said periodic voltage and said control voltage across said impedance element and prevent further conduction by said one discharge path and thereby terminate energization of said load circuit at the end of the next period of conduction by the other of said discharge paths.

4. In combination, an alternating current supply circuit, a load circuit, electric valve means interconnecting said circuits for transmitting alternating current to said load circuit and including a pair of electric discharge paths connected in reverse parallel relation, a pair of control members for controlling conduction by said discharge paths and means for energizing said control members to render said discharge paths conductive in leading and trailing relationship including means for impressing on each of said control members a holdoff voltage, an impedance element connected in series with said last mentioned means in the control member circuit of one of said discharge paths, a source of periodic voltage of peaked wave form, means for producing a control voltage dependent upon conduction by the other of said discharge paths, means including a circuit controller for connecting said control voltage and said periodic voltage across said impedance element to initiate conduction of said one discharge path associated with said control member at a predetermined point in the voltage wave of said supply circuit and to render said one discharge path conductive for each half cycle of voltage following a half cycle of conduction by the other of said discharge paths, means for energizing the control member of the other of said discharge paths to render said other path conductive for each half cycle immediately following a half cycle of conduction by said one discharge path, and means for operating said circuit controlling means to open the connection of said periodic voltage and said control voltage across said impedance element and prevent further conduction by said one discharge path and thereby terminate energization of said load circuit at the end of the next period of conduction by the other of said discharge paths.

5. In combination, an alternating current supply circuit, a load circuit, an electromagnetic circuit controller including a contact and an operating coil, a pair of electric discharge paths connected in reverse parallel relationship, means connecting said circuits for transmitting alternating current to said load circuit and including the contact of said controller connected in parallel circuit relation with said discharge paths, a control member associated with each of said discharge paths for controlling the conductivity thereof, means for impressing on each of said control members a control voltage dependent upon conduction by the discharge path associated with the other of said control members to render each of said discharge paths conducting during half cycles of voltage following conduction by the other of said discharge paths, means for producing a periodic voltage of peaked wave form, circuit controlling means for impressing said periodic voltage on one of said control members to initiate energization of said load at a predetermined instant in the voltage of said supply circuit and for energizing the operating coil of said controller to effect a subsequent closure of said contact, and means including said circuit controlling means for effecting opening of said contact and removal of said periodic voltage and said control voltage from said one control member to effect interruption of current to said load circuit following a half cycle of conduction by the other of said discharge paths.

6. In combination, an alternating current supply circuit, a load circuit, an electromagnetic circuit controller including a contact and an operating coil, a pair of electric discharge paths connected in reverse parallel relationship, means connecting said circuits for transmitting alternating current to said load circuit and including the contact of said controller connected in parallel circuit relation with said discharge paths, a control member associated with each of said discharge paths for controlling the conductivity thereof, means for producing a periodic voltage, and means including circuit controlling means for impressing said periodic voltage on one of said control members to initiate energization of said load at a predetermined instant in the voltage of said supply circuit and for energizing the operating coil of said controller to effect a subsequent closure of said contact to relieve said discharge paths of current carrying duty.

MAURICE E. BIVENS.

REFERENCES CITED

The following references are of record in the file of this patent:

UNITED STATES PATENTS

| Number | Name | Date |
|---|---|---|
| 799,052 | Hewitt | Sept. 12, 1905 |
| 799,053 | Hewitt | Sept. 12, 1905 |
| 876,918 | Thomas | Jan. 14, 1908 |
| 1,669,493 | Slepian | May 15, 1928 |
| 1,681,196 | Rudenberg | Aug. 21, 1928 |
| 1,750,581 | Egg | Mar. 11, 1930 |
| 1,902,958 | Jackson | Mar. 28, 1933 |
| 2,024,542 | Simon | Dec. 17, 1935 |
| 2,151,749 | Dawson | Mar. 28, 1939 |
| 2,151,753 | Etzrodt | Mar. 28, 1939 |
| 2,157,925 | Stoddard | May 9, 1939 |
| 2,215,804 | West | Sept. 24, 1940 |
| 2,264,175 | Dawson | Nov. 25, 1941 |
| 2,295,297 | Schneider | Sept. 8, 1942 |
| 2,355,453 | Livingston | Aug. 8, 1944 |